UNITED STATES PATENT OFFICE.

JAMES WEBSTER, OF SOLIHULL, COUNTY OF WARWICK, ENGLAND.

COMPOSITION OR ALLOY OF METALS.

SPECIFICATION forming part of Letters Patent No. 274,537, dated March 27, 1883.

Application filed October 2, 1882. (Specimens.)

*To all whom it may concern:*

Be it known that I, JAMES WEBSTER, of Solihull, in the county of Warwick, England, engineer, have invented new and useful compositions or alloys of metals of different degrees of hardness to suit various purposes; that the same has not been patented to him, nor to others with his knowledge or consent, in any foreign country, and of which the following is a specification, which I do hereby declare to be a full, clear, and exact description of the same, such as will enable others skilled in the art to which it appertains to make and use the same.

My composition consists of the following metals, combined in the proportions stated, for making a hard alloy for use in the atmosphere. In all cases the parts of the metals are parts by weight. I take one part of bismuth, three parts of lead, six parts of zinc, fifteen parts of nickel, twenty-five parts of copper, fifty parts of antimony—total, one hundred parts. I melt the said metals in a suitable pot or crucible, and at the same time thoroughly mix them, and then run the alloy thus produced into molds of any convenient shape or form for future use. This is a hard metallic alloy, and may be made into reflectors for mirrors, lamps, and the like, also into other articles requiring a high degree of hardness or polish, also into axle and shaft bearings, valves, and other similar articles.

I make certain analogous alloys not claimed herein, in some of which tin is substituted for zinc, and in others of which both of these metals are used. These alloys will form the subject-matter of separate applications.

I am aware that it is not new to make an alloy consisting of copper, glass, antimony, tin, zinc, and lead, as described in United States Patent No. 160,885; also an alloy consisting of tin, bismuth, antimony, nickel, and cadmium, with or without copper, in the proportions stated in United States Patent No. 153,154; also an alloy consisting of lead, regulus of antimony, nickel, copper, zinc, and tin, or of lead, antimony, tin, nickel, cobalt, copper, and bismuth, as in British Patent No. 1,478 of 1855; also an alloy composed of phosphorus, copper, tin, zinc, and lead, or tin, lead, copper, bismuth, and phoshorus, as in British Patent No. 12,325 of 1848. I therefore do not claim any of these alloys; but What I do claim is—

A metallic alloy consisting of bismuth, lead, zinc, nickel, copper, and antimony, substantially as and in the proportions stated.

In testimony whereof I have hereto set my hand this 11th day of September, 1882.

JAMES WEBSTER.

Witnesses:
WILLIAM COOKE,
JAMES CLARKE.